United States Patent
Okada

[11] Patent Number: 6,115,336
[45] Date of Patent: Sep. 5, 2000

[54] APPARATUS FOR OPTICALLY RECORDING DATA INTO A DISC

[75] Inventor: Mitsuya Okada, Tokyo, Japan

[73] Assignee: NEC Corporation, Tokyo, Japan

[21] Appl. No.: 09/088,065

[22] Filed: Jun. 1, 1998

[30] Foreign Application Priority Data

Jun. 4, 1997 [JP] Japan ................................. 9-146484

[51] Int. Cl.$^7$ ..................................................... G11B 7/00
[52] U.S. Cl. .................... 369/44.32; 369/112; 369/54; 369/94
[58] Field of Search .............................. 369/44.32, 44.27, 369/44.28, 44.29, 44.25, 44.23, 44.14, 44.12, 44.41, 112, 110, 109, 13, 94, 93, 58, 54

[56] References Cited

U.S. PATENT DOCUMENTS

| | | | |
|---|---|---|---|
| 5,446,565 | 8/1995 | Komma et al. | 369/94 X |
| 5,787,062 | 7/1998 | Mochizuki . | |
| 5,793,734 | 8/1998 | Tsuchiya et al. | 369/112 |

FOREIGN PATENT DOCUMENTS

| | | |
|---|---|---|
| 0 414 380 A2 | 2/1991 | European Pat. Off. . |
| 0 414 380 A3 | 1/1992 | European Pat. Off. . |
| 0 731 457 A2 | 9/1996 | European Pat. Off. . |
| 0 762 403 A2 | 3/1997 | European Pat. Off. . |
| 0 762 403 A3 | 7/1997 | European Pat. Off. . |
| 4-95224 | 3/1992 | Japan . |
| 6-282866 | 10/1994 | Japan . |
| 6-325405 | 11/1994 | Japan . |
| 7-65409 | 3/1995 | Japan . |
| 7-105566 | 4/1995 | Japan . |
| 8-138262 | 5/1996 | Japan . |
| 8-227552 | 9/1996 | Japan . |
| 8-235630 | 9/1996 | Japan . |
| 8-287588 | 11/1996 | Japan . |
| 8-306056 | 11/1996 | Japan . |
| 9-35401 | 2/1997 | Japan . |
| 9-63108 | 3/1997 | Japan . |
| 9-91858 | 4/1997 | Japan . |
| 9-115231 | 5/1997 | Japan . |
| 9-120623 | 5/1997 | Japan . |
| 9-153252 | 6/1997 | Japan . |

OTHER PUBLICATIONS

Japanese Office Action, dated Aug. 31, 1999, with English language translation of Japanese Examiner's comments.

*Primary Examiner*—Muhammad Edun
*Attorney, Agent, or Firm*—McGuire Woods

[57] ABSTRACT

There is provided an apparatus for optical recording, reproducing and erasing data into or from a recording medium, including an optical head for recording, reproducing or erasing data into or from a recording medium by emitting a light to the recording medium, the optical head including at least an objective lens and a laser diode, a sensor for sensing a thickness of the recording medium, and a focal distance compensator for varying a focal distance of the light in accordance with a thickness sensed by the sensor, the focal distance compensator including a convex lens located between the objective lens and the laser diode and designed to be able to located in or out of an optical path. In accordance with the above-mentioned apparatus, a thickness of a recording medium is readily measured by the sensor, and the focal distance compensator adjusts a focal distance of a light emitted from the light source in accordance with the measured thickness of a recording medium. Hence, it is always possible to properly record, reproduce and erase data into or from a recording medium.

29 Claims, 7 Drawing Sheets

APPARATUS FOR OPTICALLY RECORDING DATA INTO A DISC

BACKGROUND OF THE INVENTION

1. Field of the Invention

The invention relates to an apparatus for optical recording, reproducing and erasing data into or from a recording medium by radiating a laser beam, and more particularly to such an apparatus having a function of properly radiating a laser beam to a recording medium by compensating for a focal distance of a laser beam in accordance with a thickness of a recording medium.

2. Description of the Related Art

A system for recording data into an optical disc by radiating a laser beam makes it possible to record a large amount of data, and make quick access to data without any mechanical contact, and hence, has been put to practical use as a large capacity memory. An optical disc may be grouped into many types such as a read-only type used only for reproducing data therefrom, such as a compact disc and a laser disc, a write-one type by which a user can additionally record data thereinto, and a rewritable type by which a user can newly record data thereinto and erase data therefrom. The write-once type and rewritable type optical discs are used an external memory for a computer, or as files to store documents and/or images therein.

In a presently used optical disc, a reproduction signal is detected from a laser beam having been modulated at and reflected from an optical disc. For instance, in an optical disc from which data is reproduced only, a reproduction signal is detected by means of concave and convex pits which are formed at a surface of an optical disc and by which reflected light is varied in amount. In an optical disc into which a user can newly record data, data is reproduced by detecting a variation in an amount of a reflected light, caused by phase change or fine pits formed at a surface of an optical disc by radiation of laser thereto.

In a magneto-optic disc which one of rewritable type discs, magnetization of a record film is detected as a variation in a polarizing plane by virtue of magneto-optical effect of the record film. In a phase-change type optical disc which is also one of rewritable type discs, data is reproduced by detecting a variation in an amount of reflected light, caused by a phase-change, similarly to an optical disc into which a user can newly record data.

As an optical disc, a 1.2 mm-thick disc such as a compact disc (CD) and CD-ROM has been used. However, in these days, there has been developed highly densified optical discs such as DVD, DVD-ROM, and rewritable DVD-RAM. In such optical discs, a laser beam is designed to have a shorter wavelength and focused with a lens having a greater numerical aperture (NA) in order to make it possible to record, reproduce and erase data at a density as high as possible, in which case, a 0.6-mm thick disc has been employed for reducing aberration caused by inclination of an optical disc.

A magnetically modulated type magneto-optic disc which is of photo-electromagnetic record type is designed to be made of a substrate having a thickness of 0.8 mm.

Thus, there has been proposed a plurality of optical discs which have a similar shape, but have different thickness.

A user would expect to record, reproduce and erase data into or from a plurality of optical discs with a single disc drive. That is, it is preferable for a user to record, reproduce and erase data into or from optical discs having different thickness by means of a common disc drive.

However, an optical disc is accompanied with a problem as follows. A laser beam is focused through a disc substrate in an optical disc. Hence, when a laser beam is to be passed through a plurality of optical discs, a laser beam cannot be properly focused by means of a single focusing lens, if the optical discs have different thickness.

In order to solve such a problem, there have been suggested many optical heads including means for compensating for a difference in a thickness of disc substrates.

For instance, Japanese Unexamined Patent Publication No. 8-235630 has suggested an optical head including a plate in a disc tray for compensating for a difference in a thickness of disc substrates.

Japanese Unexamined Patent Publication No. 8-138262 has suggested an optical pick up compensating for focusing characteristic thereof by providing a variable aperture system between an objective lens and a laser diode.

Japanese Unexamined Patent Publication No. 7-65409 has suggested an optical data recording and reproducing device compensating for focusing characteristic thereof by providing a convex lens between an objective lens and a laser diode.

Japanese Unexamined Patent Publications Nos. 7-105566 and 6-282866 have suggested an optical pick-up apparatus and an optical disc apparatus including a member or a transparent plate having a variable index of refraction or a variable thickness and located in a convergent optical path between an objective lens and a disc.

Japanese Unexamined Patent Publication No. 4-95224 has suggested an optical disc apparatus having a plurality of focusing optical systems.

Japanese Unexamined Patent Publication No. 6-325405 has suggested an optical data-reproducing apparatus including a first light source for emitting a first laser beam having a first wavelength, a second light source for emitting a second laser beam having a second wavelength longer than the first wavelength, and an optical system for introducing the first and second laser beams to a recording medium, and introducing the first and second laser beams reflected from the recording medium, to a photodetector. When the recording medium is a highly densified one, data is recorded to the recording medium by the second laser beam and data is reproduced from the recording medium by the first laser beam. When the recording medium is a low densified one, data is recorded to and reproduced from the recording medium by the second laser beam.

When optical discs having different thickness are to be used in the above-mentioned apparatuses, a thickness of an optical disc is recognized as follows. If an optical disc is encased in a cartridge, an identification hole formed with a cartridge is detected to thereby recognize a thickness of an optical disc. As an alternative, a bar code which is written on an optical disc and represents data about a thickness of an optical disc is read out to thereby identify a thickness of an optical disc.

However, if an optical disc is not encased in a cartridge, or if a bar code representing data about a thickness of an optical disc is not written on an optical disc, it is impossible to identify a thickness of an optical disc.

As mentioned above, if a thickness of an optical disc is not identified, it is not possible to focus a laser beam onto an optical disc by means of a common focusing lens.

SUMMARY OF THE INVENTION

In view of the foregoing problem of the conventional apparatuses, it is an object of the present invention to provide an optical data-recording apparatus capable of identifying a thickness of a recording medium and compensating for a focal distance of a laser beam in accordance with a thickness of a recording medium.

There is provided an apparatus for optical recording, reproducing and erasing data into or from a recording medium, including (a) an optical head for recording, reproducing or erasing data into or from a recording medium by emitting a light to the recording medium, (b) a sensor for sensing a thickness of the recording medium, and (c) a focal distance compensator for varying a focal distance of the light in accordance with a thickness of the recording medium sensed by the sensor.

The focal distance compensator may be comprised of a variable aperture located between an objective lens and a laser diode, both of the optical head. As an alternative, the focal distance compensator may be comprised of a member having a variable index of refraction and located between an objective lens of an optical disc and a recording medium. The focal distance compensator may be comprised of a member having a variable thickness and located between an objective lens of an optical disc and a recording medium. The member may be composed of a transparent plate.

There is further provided an apparatus for optical recording, reproducing and erasing data into or from a recording medium, including (a) an optical head for recording, reproducing or erasing data into or from a recording medium by emitting a light to the recording medium, the optical head including at least an objective lens and a laser diode, (b) a sensor for sensing a thickness of the recording medium, and (c) a focal distance compensator for varying a focal distance of the light in accordance with a thickness of the recording medium sensed by the sensor, the focal distance compensator including a convex lens located between the objective lens and the laser diode and designed to be able to located in or out of an optical path.

The apparatus may further include a convex lens driver for moving the convex lens in such a manner that the convex lens is located in or out of an optical path. The apparatus may further comprise a spring for applying a bias force to the convex lens so that the convex lens is located out of an optical path.

For instance, the sensor may include (a) a light source, (b) a first optical system for focusing a light emitted from the light source onto a recording medium, (c) a light detecting device, and (d) a second optical system for leading a light reflected from the recording medium, to the light detecting device. The first optical system may be comprised of a convex lens or a combination of a convex lens and a concave lens.

The light source may be designed to emit a light obliquely to the recording medium, in which case, the light detecting device receives a regular reflection light. As an alternative, the light source may be designed to emit a light perpendicularly to the recording medium, in which case, the light detecting device receives a scattered light obliquely reflected from the recording medium. The light source may be designed to emit a light having a particular wavelength, in which case, the second optical system is comprised of a transmission type grating which passes therethrough a light incident at a predetermined angle and having the particular wavelength.

It is preferable that the light detecting device is comprised of a plurality of light receiving sections for detecting how a location where the light detecting device receives a light varies.

The apparatus may further include a plurality of output terminals each of which is connected to each of the light receiving sections, so that a location where the light detecting device receives a light can be identified by detecting an output terminal through which an output signal is emitted.

In accordance with the above-mentioned apparatus, a thickness of a recording medium is identified by the sensor. The focal distance compensator adjusts a focal distance of a light emitted from the light source in accordance with the thus measured thickness of a recording medium. Hence, it is always possible to focus a laser beam onto a recording medium by means of a common focusing lens, which ensures it is possible to properly record, reproduce and erase data into or from a recording medium.

The above and other objects and advantageous features of the present invention will be made apparent from the following description made with reference to the accompanying drawings, in which like reference characters designate the same or similar parts throughout the drawings.

DESCRIPTION OF THE PREFERRED EMBODIMENTS

Figure 1:
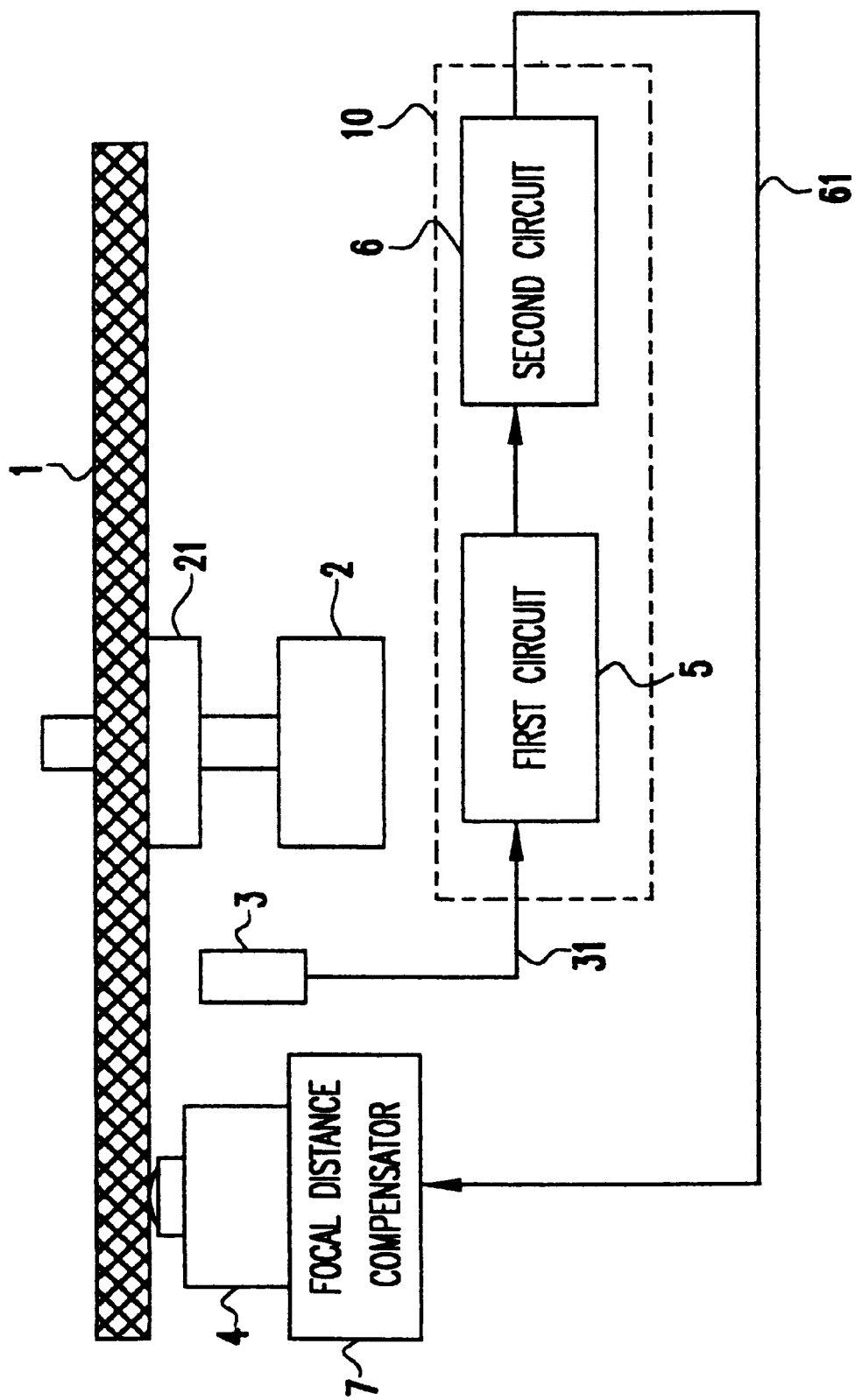
FIG. 1 is a schematic view of an optical data-recording apparatus in accordance with the preferred embodiment of the present invention.

FIG. 1 illustrates an optically data-recording apparatus in accordance with a preferred embodiment of the present invention.

The illustrated apparatus includes a spindle motor 2 for mounting an optical disc thereon, a sensor 3 for measuring a thickness of the optical disc 1, a signal processing circuit 10 for processing a sense signal 31 emitted from the sensor 3 to thereby determine a thickness of the optical disc 1, an optical head 4 for recording, reproducing and erasing data into or from the optical disc 1, and a focal distance compensator 7 formed together with the optical head 4.

The sensor 3 emits a laser beam, LED light, or a lamp light to the optical disc 1, and includes a light detecting device (later mentioned) which receives a light reflected from the optical disc 1. The sensor 3 determines a distance between the sensor 3 itself and a lower surface of the optical disc 1 at which a light emitted from the sensor 3 is reflected, based on a location of the light detecting device. The sensor 3 is located in the vicinity of the spindle motor 2 independently of the optical head 4. Since a lower surface of the optical disc 1 is at the same level with a disc-mounting surface 21 of the spindle motor 2, if a positional relation between the disc-mounting surface 21 and the sensor 3 is kept unchanged, the sense signal 31 emitted from the sensor 3 varies in accordance with a thickness of the optical disc 1. Hence, it is relatively easy to identify a thickness of the optical disc 1.

The signal processing circuit 10 is comprised of a first circuit 5 which receives the sense signal 31 from the sensor 3 and determines a distance between the optical head 4 and the optical disc 1 to thereby identify a thickness of the optical disc 1, and a second circuit 6 which receives a signal representing a thickness of the optical disc 1 from the first circuit 5, and emits a control signal 61 to the focal distance compensator 7 to thereby control an operation of the focal distance compensator 7 in accordance with a thickness of the optical disc 1.

The focal distance compensator 7 makes it possible to record, reproduce and erase data into or from optical discs 1 having different thicknesses, as mentioned later in detail.

Figure 2:
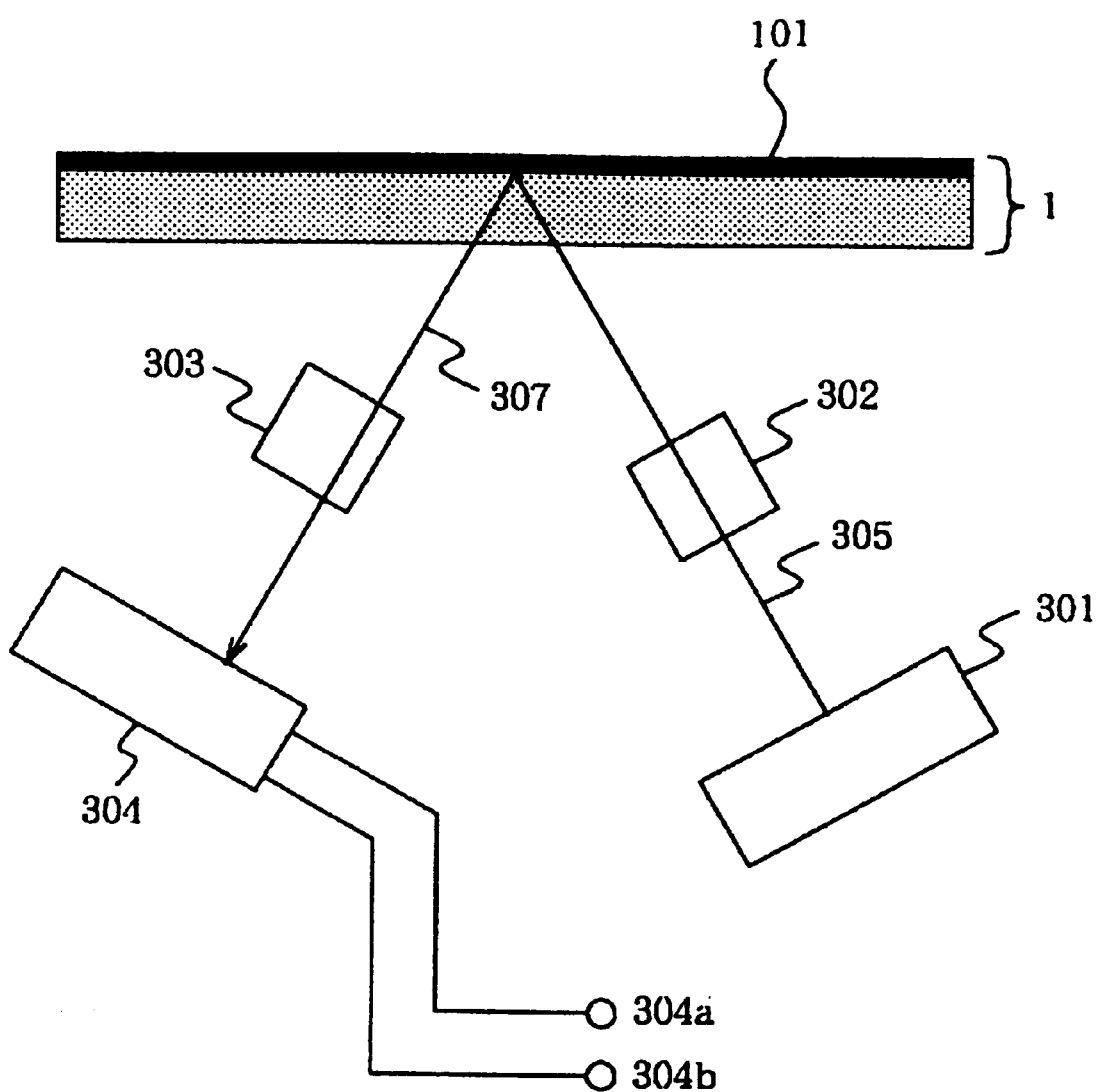
FIG. 2 is a schematic view of a sensor for sensing a thickness of a recording medium, used in an optical data-recording apparatus in accordance with the preferred embodiment of the present invention.
Figure 3:
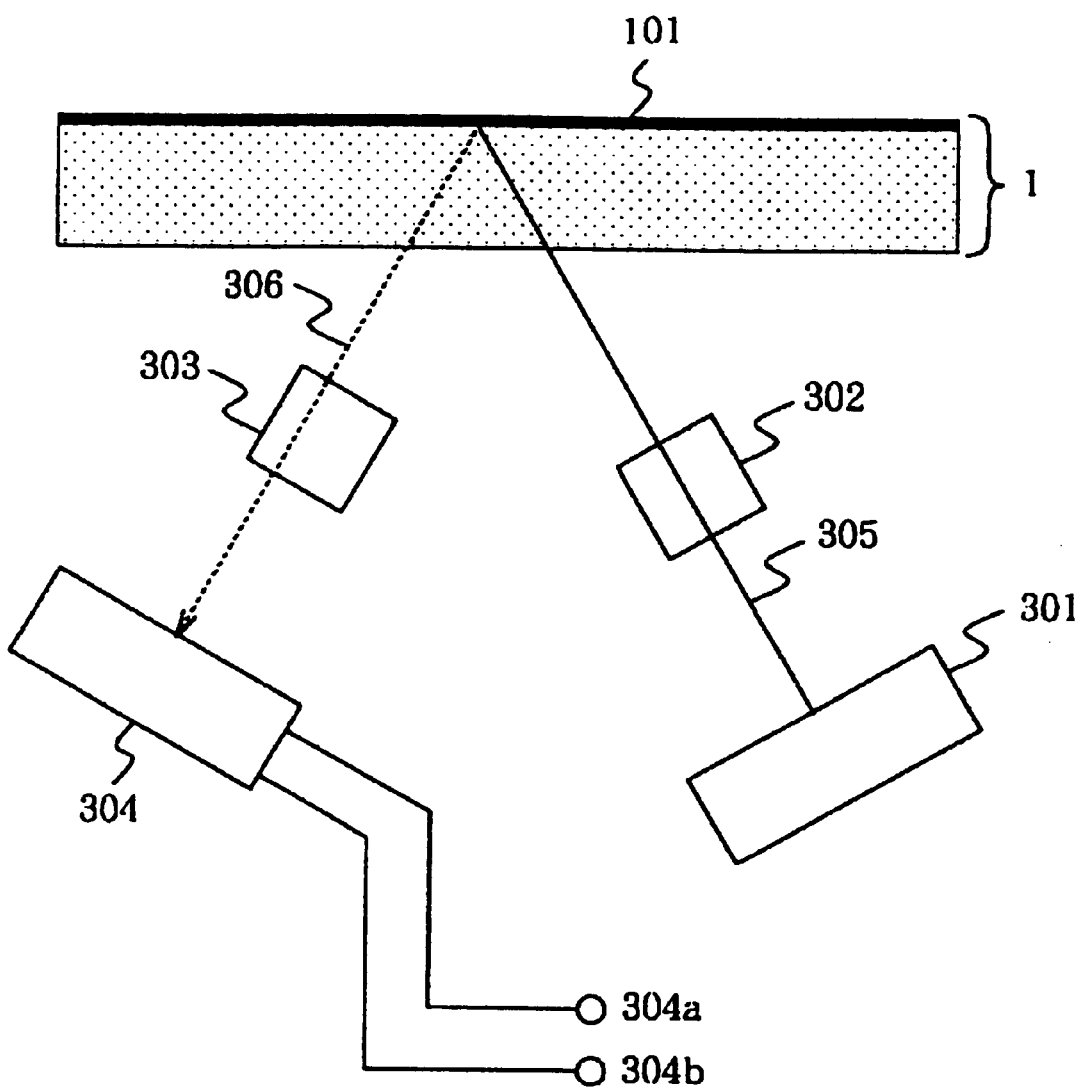
FIG. 3 is a schematic view of a sensor for sensing a thickness of a recording medium, used in an optical data-recording apparatus in accordance with the preferred embodiment of the present invention.
Figure 4:
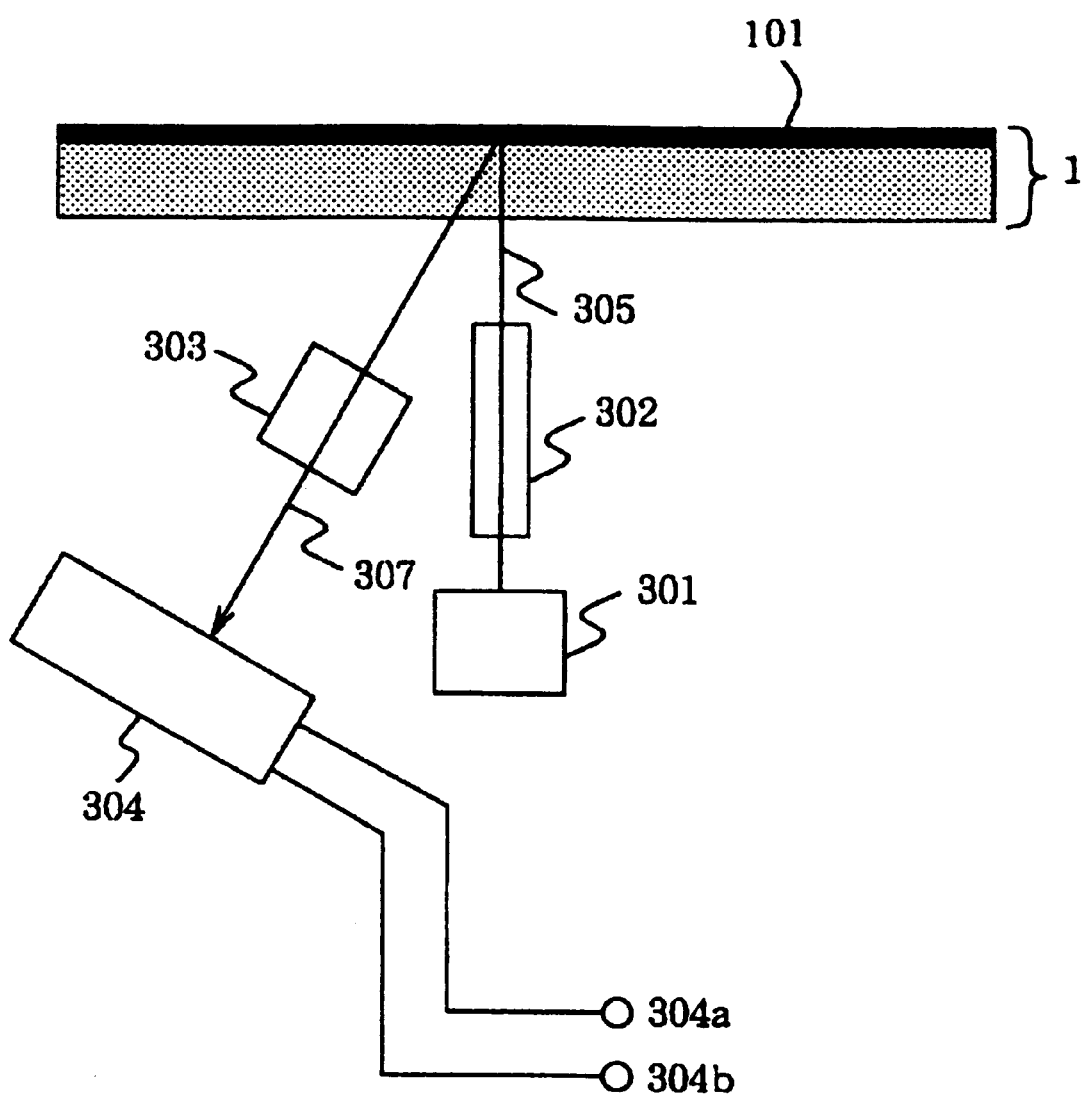
FIG. 4 is a schematic view of a sensor for sensing a thickness of a recording medium, used in an optical data-recording apparatus in accordance with the preferred embodiment of the present invention.
Figure 5:
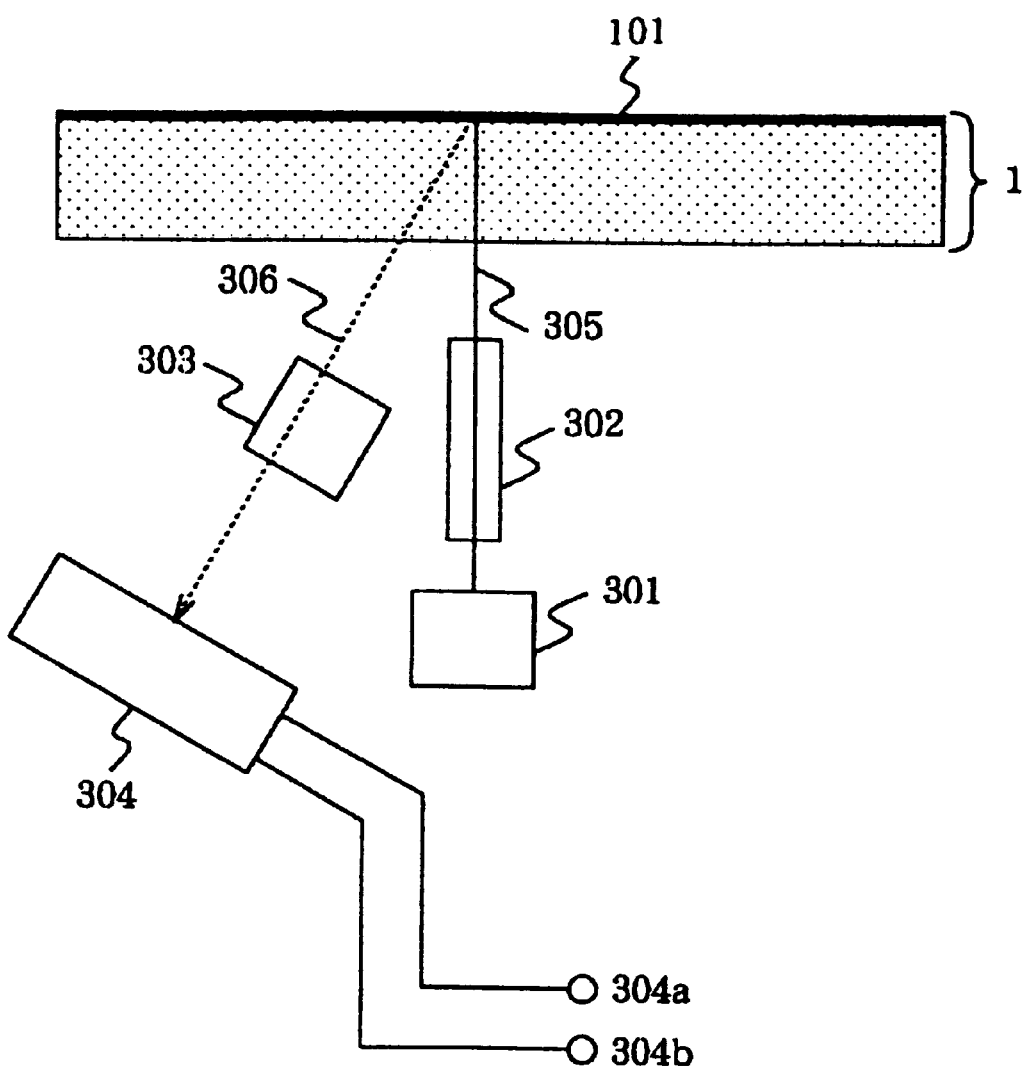
FIG. 5 is a schematic view of a sensor for sensing a thickness of a recording medium, used in an optical data-recording apparatus in accordance with the preferred embodiment of the present invention.

Hereinbelow are explained a structure of the sensor 3 and the principle of detecting a thickness of the optical disc 1, with reference to FIGS. 2 to 5. FIGS. 2 and 3 illustrate the same sensor 3 detecting different thicknesses of the optical discs 1, and FIGS. 4 and 5 illustrate another sensor 3 detecting different thicknesses of the optical discs 1. In FIGS. 2 to 5, the same parts or elements have been provided with the same reference numerals.

The sensor 3 is a kind of a displacement sensor, and is comprised of a light source 301, a first optical system 302 for focusing light 305 emitted from the light source 301 onto the optical disc 1, a light detecting device 304, and a second optical system 303 for introducing a light 307 reflected from the optical disc 1 into the light detecting device 304.

The first optical system 302 is comprised of a convex lens, or a combination of a convex lens and a concave lens. The light 305 emitted from the light source 301 is radiated onto the optical disc 1 through the first optical system 302. The light 305 incident to the optical disc 1 may be a parallel light or a focused light. However, if the optical disc 1 is composed of a material having a light-absorbing characteristic, it would be impossible to have the reflected light 307. Hence, in such a case, the light 305 is necessary to have a wavelength at which the light 305 is less absorbed in the optical disc 1. For instance, if the optical disc 1 is composed of polycarbonate resin or glass, there may be used a light source 301 emitting a visible light or a near infrared light having a wavelength in the range of 400 nm to 900 nm.

As illustrated in FIG. 2, the optical disc 1 has a medium surface 101 which has a higher reflectivity than that of a surface of the optical disc 1. Hence, almost all the light 305 is reflected at the medium surface 101 of the optical disc 1. If a reflectivity of the medium surface 101 is dependent on a wavelength of the light 305, it is preferable that the light 305 has a wavelength at which a possibly high reflectivity is accomplished.

The light 306 reflected from the medium surface 101 of the optical disc 1 is focused on the light detecting device 304 by the second optical system 303. The light source 301 may radiate a light obliquely or perpendicularly to the optical disc 1. In the sensors 3 illustrated in FIGS. 2 and 3, the light source 301 emits the light 305 obliquely to the optical disc 1, and the light 307 regularly reflected from the optical disc 1 is received in the light detecting device 304. In FIGS. 4 and 5, the light source 301 emits the light 305 perpendicularly to the optical disc 1, and the scattered light 307 obliquely reflected from the optical disc 1 is received in the light detecting device 304.

In the sensors 3 illustrated in FIGS. 4 and 5 where the light 305 is perpendicularly radiated to the optical disc 1, it is necessary to control the reflected, scattered light 307 or 306 with a scattering angle thereof. To this end, the light source 310 may be designed to emit a light 305 having a particular wavelength, and the second optical system 303 may be designed to be comprised of a transmission type grating through which only a light having the particular wavelength and is incident to the second optical system 303 at a predetermined angle is allowed to pass.

The light detecting device 304 is designed to have a plurality of light receiving sections (not illustrated) in order to detect a variation in a location where the light detecting device 304 receives the light 307 or 306. When the light 307 or 306 is incident to the light detecting device 304 at different locations because of a difference in a thickness of the optical disc 1, a variation in a location where the light detecting device 304 receives the light 307 or 306 is converted into an electric signal, and the thus produced electric signal is output to the signal processing circuit 10.

If each of the light receiving sections is provided with an output terminal, it would be possible to identify a location where the light detecting device 304 receives the light 307 or 306, by identifying one of the output terminals through which the electric signal is transmitted.

For instance, as illustrated in FIGS. 2 to 5, the light detecting device 304 is formed with first and second output terminals 304a and 304b. Suppose that an optical disc 1 having a thickness of 1.2 mm and an optical disc 1 having a thickness of 0.6 mm are mounted on the disc-mounting surface 21 of the spindle motor 2, and data is reproduced from those two optical discs. The sensor 3 can be designed to operate in such a manner that when the 1.2 mm-thick optical disc 1 is mounted on the spindle motor 2, a signal is transmitted through the first output terminal 304a, and when the 0.6 mm-thick optical disc 1 is mounted on the spindle motor 2, a signal is transmitted through the second output terminal 304b. In accordance with this arrangement, it is quite easy to identify a thickness of the optical disc 1.

The optical disc 1 has different thicknesses between FIGS. 2 and 4 and FIGS. 3 and 5, and hence, the lights 307 and 306 reflected from the optical discs 1 are incident to the light detecting device 304 at different locations. Thus, the different sense signals 31 are transmitted to the first circuit 5 of the signal processing circuit 10 from the different output terminals 304a and 304b.

Hereinbelow is explained a relation between the focal distance compensator 7 and the sense signal 31 emitted from the sensor 3. As mentioned earlier, the optical head 4 includes the focal distance compensator 7 for making it possible to record, reproduce and erase data into or from the optical discs 1 having different thicknesses with one optical system in the optical head 4. The focal distance compensator 7 may be comprised of a variable aperture located between an objective lens and a laser diode both of the optical head 4, a convex lens located between an objective lens and a laser diode to thereby adjust a focusing characteristic, or a member or a transparent plate located between an objective lens and the optical disc 1 in a convergent optical path and having a variable thickness or a variable index of refraction.

Even if the focal distance compensator 7 is designed to have any one of the above-mentioned structures, the focal distance compensator 7 is required to receive the sense signal 31 for operation. In the instant embodiment, the sense signal 31 is transmitted to the focal distance compensator 7 from the sensor 3 to thereby switch a focusing system in accordance with a thickness of the optical disc 1, which ensures that data is recorded, reproduced and erased into or from the optical disc 1 with a single optical system of the optical head 4.

Figure 6:
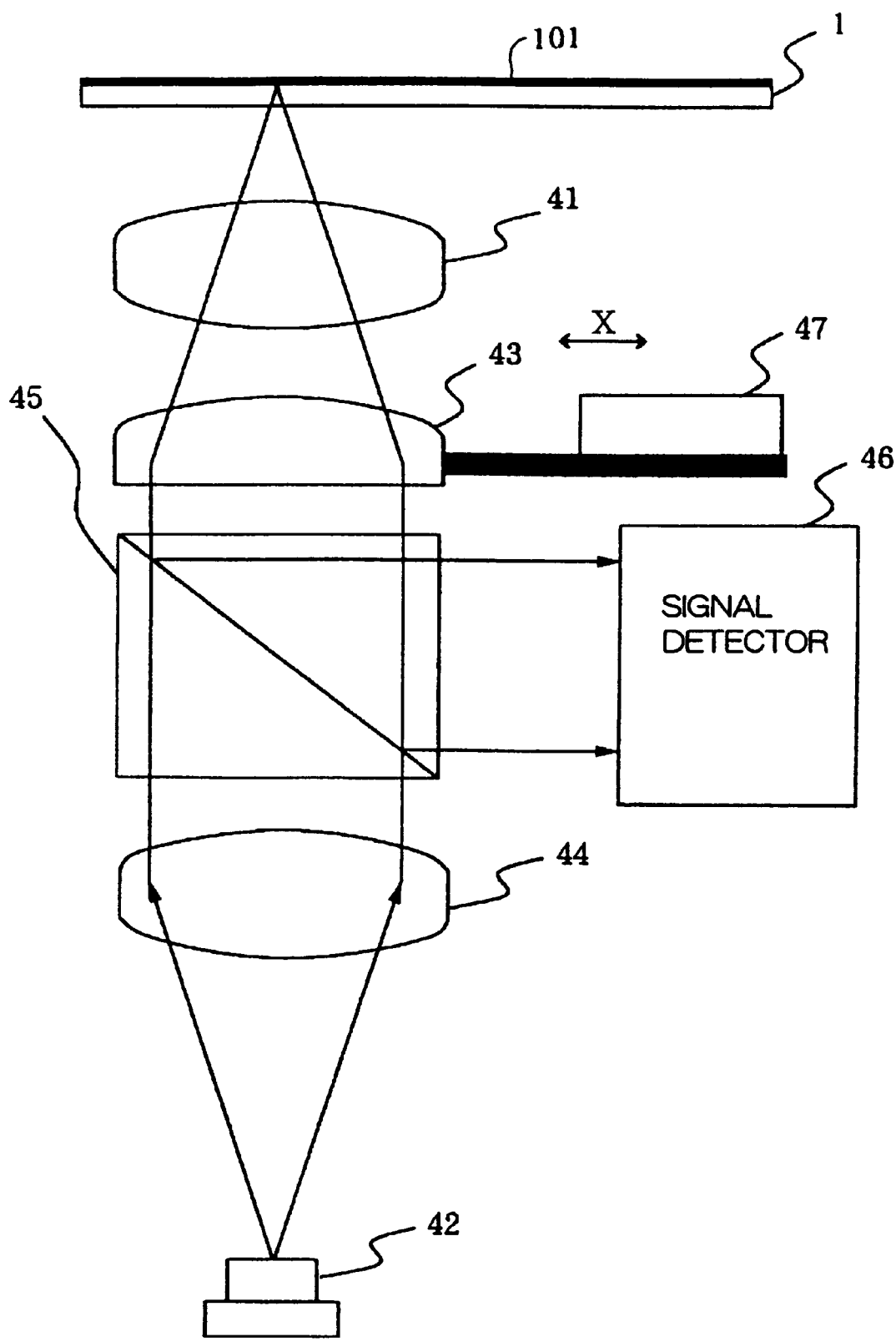
FIG. 6 is a schematic view of an optical head used in an optically data-recording apparatus in accordance with the preferred embodiment of the present invention.

FIG. 6 illustrates an example of the focal distance compensator 7 including a convex lens located between an objective lens and a laser diode.

The illustrated focal distance compensator 7 is comprised of a laser diode 42 for emitting a laser beam to the optical disc 1, a collimate lens 44 for shaping the laser beam into parallel light flux, a beam splitter 45, a convex lens 43 for adjusting a focal distance of the laser beam, and an objective lens 41.

In operation, a laser beam emitted from the laser diode 42 passes through the collimate lens 44, the beam splitter 45 and the objective lens 41, and reaches the optical disc 1. The laser beam reflected from the medium surface 101 of the optical disc 1 is reflected again at the beam splitter 45, and the thus reflected laser beam is introduced into a signal detector 46. In the signal detector 46, data recorded at the medium surface 101 of the optical disc 1 is reproduced.

The laser beam emitted from the laser diode 42 is shaped into parallel light flux by the collimate lens 44; and is focused on the medium surface 101 of the optical disc 1 by means of the objective lens 41 and the convex lens 43. The convex lens 43 is connected to and moved by a convex lens driver 47. Specifically, the convex lens 43 is made to move in a horizontal direction X by the convex lens driver 47 to thereby be positioned in or out of an optical path. A focal distance of the laser beam can be varied in accordance with whether the convex lens 7 is positioned in or out of an optical path.

The convex lens driver 47 moves the convex lens 43 in accordance with the control signal 61 emitted from the second circuit 6 of the signal processing circuit 10. As a result, a light emitted from the optical head 4 for recording, reproducing and erasing data into or from the optical disc 1 is always focused on the medium surface 101 of the optical disc 1, which ensures that data is properly recorded, reproduced and erased into or from the optical disc 1, even if optical discs having different thicknesses are used.

For instance, the convex lens driver 47 may be comprised of a step motor to horizontally draw and push the convex lens 43. As an alternative, the convex lens 43 may be always biased by a spring so that the convex lens 34 is located in an optical path. When necessary, the convex lens driver 47 draws the convex lens 43 out of an optical path against a biasing force of the spring.

Though the focal distance compensator 7 is comprised of a combination of the convex lens 43 and the convex lens driver 47 in the above-mentioned embodiment, the focal distance compensator 7 may be designed to be comprised of a light-permeable member, such as a transparent plate, having a variable thickness and/or a variable index of refraction. As an alternative, a variable aperture may be employed as the focal distance compensator 7.

Hereinbelow are described experiments the inventor conducted.

[Experiment 1]

There was employed the optical data-recording apparatus illustrated in FIG. 1. As the optical disc 1, there were prepared two discs: CD-ROM disc having a diameter of 120 mm and a thickness of 1.2 mm, and not encased in a cartridge; and DVD-ROM disc composed of a plurality of substrates deposited and adhered to each other, and having a diameter of 120 mm and a thickness of 0.6 mm.

The spindle motor 2 was designed to be able to mount thereon a disc having an internal diameter of 15 mm. Though not illustrated, the signal processing circuit 10 includes a circuit for driving the optical head 1, a circuit for controlling rotation of the optical head 1, a circuit for processing a reproduction signal, a servo circuit, and a signal recording circuit, as well as the first and second circuits 5 and 6.

As illustrated in FIG. 6, the optical head 4 was designed to have a structure in which the convex lens 43 was positioned in or out of an optical path between the objective lens 41 and the laser diode 42 by means of the convex lens driver 47 in accordance with whether the 1.2 mm-thick disc or the 0.6 mm-thick disc was mounted on the spindle motor 2.

The light source 301 was designed to emit a laser beam having a wavelength of 780 nm and an output power of 5 mW. An incident angle of the laser beam to the optical disc 1 was set 25 degrees. A distance between a tip end of the sensor 3 and the optical disc 1 was arranged in the range of 28 mm to 30 mm. The light detecting device 304 was designed to have first to fourth light receiving sections 305a, 305b, 305c and 305d arranged in a line, as illustrated in FIG. 7.

Figure 7:
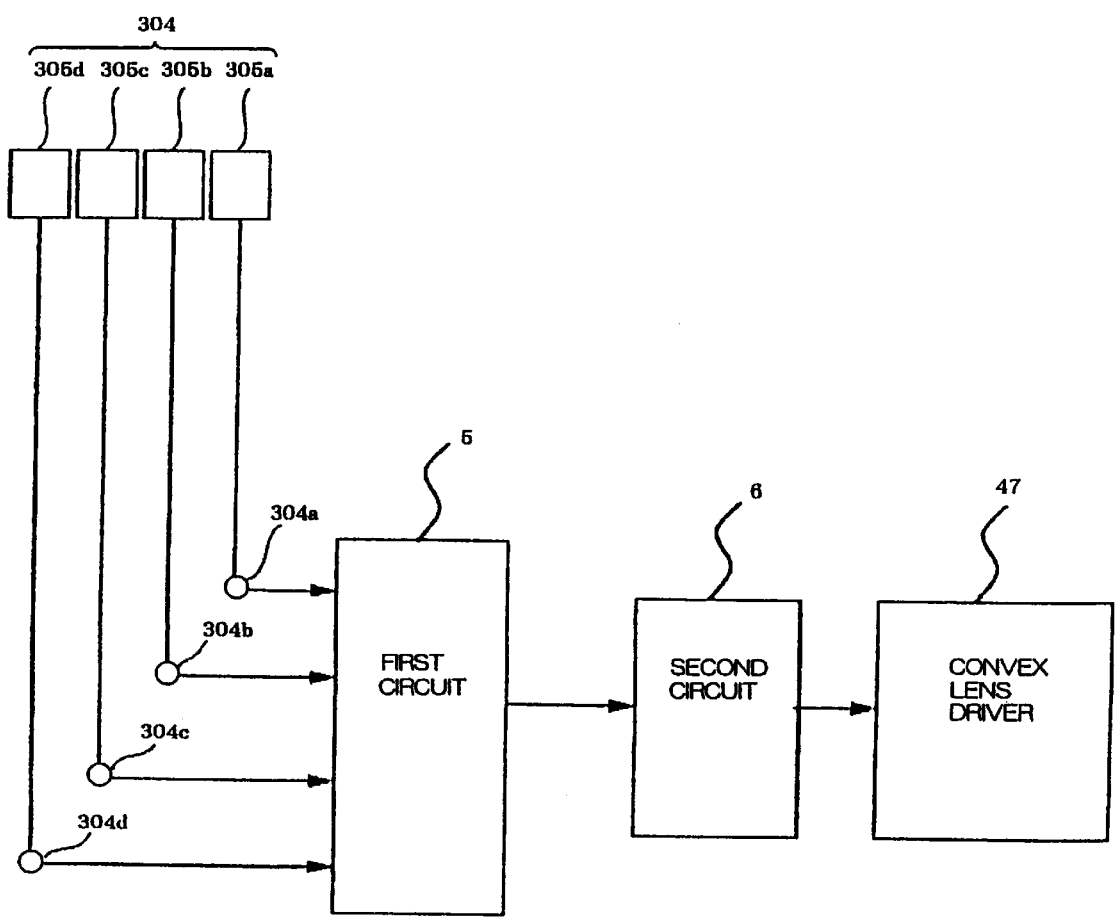
FIG. 7 is a circuit diagram for identifying a thickness of an optical disc.

As illustrated in FIG. 7, each of the first to fourth light receiving sections 305a, 305b, 305c and 305d is connected to first to fourth output terminals 304a, 304b, 304c and 304d, respectively. The sensor 3 was positioned in the vicinity of the spindle motor 2 so that the sensor 3 emits a light to the optical disc 1 at a location where an innermost reflection film of the optical disc 1 was formed. A lower surface of the optical disc 1 was at the same level with the disc-mounting surface 21 of the spindle motor 2.

Then, the light detecting device 304 was arranged in such a manner that a signal was output through the first output terminal 304a when the 1.2 mm-thick optical disc 1 was mounted on the spindle motor 2, and a signal was output through the third output terminal 304c when the 0.6 mm-thick optical disc 1 was mounted on the spindle motor 2.

The convex lens 43 was designed to be driven by the convex lens driver 47 in accordance with the signal transmitted through the first or third output terminal 304a or 304c. Specifically, a drive signal was emitted from the second circuit 6 to the convex lens driver 47 to thereby position the convex lens 43 in an optical path when a signal was transmitted through the third output terminal 304c, whereas the convex lens 43 was positioned out of an optical path by the convex lens driver 47 when a signal was not transmitted through the third output terminal 304c.

In order to confirm that the apparatus having the above-mentioned structure could properly operate, the 1.2 mm-thick CD-ROM disc and the 0.6 mm-thick DVD-ROM disc were mounted in the apparatus. First, when the 1.2 mm-thick CD-ROM disc was mounted, it was confirmed that a signal was transmitted through the first output terminal 304a. Next, when the 0.6 mm-thick DVD-ROM disc was mounted, it was confirmed that a signal was transmitted through the third output terminal 304c. In accordance with the thus produced signals transmitted through the first or third output terminal 304a or 304c, the convex lens 43 was moved in such a manner that the convex lens 43 was not positioned in an optical path when the 1.2 mm-thick CD-ROM disc was mounted, and was positioned in an optical path when the 0.6 mm-thick DVD-ROM disc was mounted. As a result, a focal distance of the laser beam emitted from the laser diode 42 was properly adjusted, that is, the laser beam was properly focused onto the optical disc 1 in dependence on a thickness of the optical disc 1.

[Experiment 2]

There was used an optical data-recording apparatus which was the same as one used in the experiment 1. As the optical head 4, there was used a high-powered LD emitting a light having a wavelength of 650 nm and an output power of 30 mW. As the optical disc 1, there were prepared two discs: a phase-change type optical disc having a diameter of 120 mm and a thickness of 1.2 mm, and not encased in a cartridge (namely, a commercially available PD disc taken out of its cartridge); and a phase-change type optical disc composed of a plurality of substrates deposited and adhered to each other, and having a diameter of 120 mm and a thickness of 0.6 mm.

Similarly to the experiment 1, the convex lens 43 was positioned in or out of an optical path between the objective lens 41 and the laser diode 42 in accordance with whether the 1.2 mm-thick disc or the 0.6 mm-thick disc was mounted in the apparatus.

In order to confirm that the apparatus having the above-mentioned structure could properly operate, the 1.2 mm-thick disc and the 0.6 mm-thick disc were mounted in the apparatus. First, when the 1.2 mm-thick disc was mounted, it was confirmed that a signal was transmitted through the first output terminal 304a. Next, when the 0.6 mm-thick disc was mounted, it was confirmed that a signal was transmitted through the third output terminal 304c. In accordance with the thus produced signals transmitted through the first or third output terminal 304a or 304c, the convex lens 43 was moved in such a manner that the convex lens 43 was not positioned in an optical path when the 1.2 mm-thick disc was mounted, and was positioned in an optical path when the 0.6 mm-thick disc was mounted. As a result, a focal distance of the laser beam emitted from the laser diode 42 was properly adjusted, that is, the laser beam was properly focused onto the optical disc 1 in dependence on a thickness of the optical disc 1.

[Experiment 3]

There was used an optically data-recording apparatus which was the same as one used in the experiment 1. As the optical head 4, there was used a high-powered LD emitting a light having a wavelength of 650 nm and an output power of 30 mW. As the optical disc 1, there were prepared two discs: a phase-change type optical disc having a diameter of 120 mm and a thickness of 1.2 mm, and not encased in a cartridge (namely, a commercially available PD disc taken out of its cartridge); and a phase-change type optical disc composed of a plurality of substrates deposited and adhered to each other, and having a diameter of 120 mm and a thickness of 0.8 mm.

Similarly to the experiment 1, the convex lens 43 was positioned in or out of an optical path between the objective lens 41 and the laser diode 42 in accordance with whether the 1.2 mm-thick disc or the 0.8 mm-thick disc was mounted in the apparatus.

In order to confirm that the apparatus having the above-mentioned structure could properly operate, the 1.2 mm-thick disc and the 0.8 mm-thick disc were mounted in the apparatus. First, when the 1.2 mm-thick disc was mounted, it was confirmed that a signal was transmitted through the first output terminal 304a. Next, when the 0.8 mm-thick disc was mounted, it was confirmed that a signal was transmitted through the second output terminal 304b. In accordance with the thus produced signals transmitted through the first or second output terminal 304a or 304b, the convex lens 43 was moved in such a manner that the convex lens 43 was not positioned in an optical path when the 1.2 mm-thick disc was mounted, and was positioned in an optical path when the 0.8 mm-thick disc was mounted. As a result, a focal distance of the laser beam emitted from the laser diode 42 was properly adjusted, that is, the laser beam was properly focused onto the optical disc 1 in dependence on a thickness of the optical disc 1.

[Experiment 4]

There was used an optical data-recording apparatus which was the same as one used in the experiment 1. As the optical head 4, there was used a high-powered LD for a magneto-optic disc, emitting a light having a wavelength of 680 nm and an output power of 30 mW. As the optical disc 1, there were prepared two discs: a magneto-optic disc having a diameter of 86 mm and a thickness of 1.2 mm, and not encased in a cartridge (namely, a commercially available magneto-optic disc taken out of its cartridge with a magnet hub at an inner diameter being removed therefrom); and a phase-change type optical disc composed of a plurality of substrates deposited and adhered to each other, and having a diameter of 86 mm and a thickness of 0.6 mm.

Similarly to the experiment 1, the convex lens 43 was positioned in or out of an optical path between the objective lens 41 and the laser diode 42 in accordance with whether the 1.2 mm-thick disc or the 0.6 mm-thick disc was mounted in the apparatus.

In order to confirm that the apparatus having the above-mentioned structure could properly operate, the 1.2 mm-thick magneto-optic disc and the 0.6 mm-thick disc were mounted in the apparatus. First, when the 1.2 mm-thick photo-electro-magnetic disc was mounted, it was confirmed that a signal was transmitted through the first output terminal 304a. Next, when the 0.6 mm-thick disc was mounted, it was confirmed that a signal was transmitted through the third output terminal 304c. In accordance with the thus produced signals transmitted through the first or third output terminal 304a or 304c, the convex lens 43 was moved in such a manner that the convex lens 43 was not positioned in an optical path when the 1.2 mm-thick photo-electro-magnetic disc was mounted, and was positioned in an optical path when the 0.6 mm-thick disc was mounted. As a result, a focal distance of the laser beam emitted from the laser diode 42 was properly adjusted, that is, the laser beam was properly focused onto the optical disc 1 in dependence on a thickness of the optical disc 1.

[Experiment 5]

There was used an optical data-recording apparatus which was the same as one used in the experiment 1. As the optical head 4, there was used a high-powered LD emitting a light having a wavelength of 780 nm and an output power of 30 mW. As the optical disc 1, there were prepared two discs: a phase-change type optical disc having a diameter of 120 mm and a thickness of 1.2 mm, and not encased in a cartridge (namely, a commercially available PD disc taken out of its cartridge); and DVD-ROM disc composed of a plurality of substrates deposited and adhered to each other, and having a diameter of 120 mm and a thickness of 0.6 mm.

Similarly to the experiment 1, the convex lens 43 was positioned in or out of an optical path between the objective lens 41 and the laser diode 42 in accordance with whether the 1.2 mm-thick disc or the 0.6 mm-thick DVD-ROM disc was mounted in the apparatus.

In order to confirm that the apparatus having the above-mentioned structure could properly operate, the 1.2 mm-thick disc and the 0.6 mm-thick disc were mounted in the apparatus. First, when the 1.2 mm-thick disc was mounted, it was confirmed that a signal was transmitted through the first output terminal 304a. Next, when the 0.6 mm-thick DVD-ROM disc was mounted, it was confirmed that a signal was transmitted through the third output terminal 304c. In accordance with the thus produced signals transmitted through the first or third output terminal 304a or 304c, the convex lens 43 was moved in such a manner that the convex lens 43 was not positioned in an optical path when the 1.2 mm-thick disc was mounted, and was positioned in an optical path when the 0.6 mm-thick DVD-ROM disc was mounted. As a result, a focal distance of the laser beam emitted from the laser diode 42 was properly adjusted, that is, the laser beam was properly focused onto the optical disc 1 in dependence on a thickness of the optical disc 1.

[Experiment 6]

There was used an optical data-recording apparatus which was the same as one used in the experiment 1. As the optical head 4, there was used a high-powered LD for a photo-electro-magnetic disc, emitting a light having a wavelength of 680 nm and an output power of 30 mW. As the optical disc 1, there were prepared two discs: a photo-electro-magnetic disc having a diameter of 86 mm and a thickness of 1.2 mm, and not encased in a cartridge (namely, a commercially available magneto-optic disc taken out of its cartridge with a magnet hub at an inner diameter being removed therefrom); and an optical disc composed of a single substrate and having a diameter of 86 mm and a thickness of 0.8 mm.

Similarly to the experiment 1, the convex lens 43 was positioned in or out of an optical path between the objective lens 41 and the laser diode 42 in accordance with whether the 1.2 mm-thick disc or the 0.8 mm-thick disc was mounted in the apparatus.

In order to confirm that the apparatus having the above-mentioned structure could properly operate, the 1.2 mm-thick magneto-optic disc and the 0.8 mm-thick disc were mounted in the apparatus. First, when the 1.2 mm-thick photo-electro-magnetic disc was mounted, it was confirmed that a signal was transmitted through the first output terminal 304a. Next, when the 0.8 mm-thick disc was mounted, it was confirmed that a signal was transmitted through the second output terminal 304b. In accordance with the thus produced signals transmitted through the first or second output terminal 304a or 304b, the convex lens 43 was moved in such a manner that the convex lens 43 was not positioned in an optical path when the 1.2 mm-thick photo-electro-magnetic disc was mounted, and was positioned in an optical path when the 0.8 mm-thick disc was mounted. As a result, a focal distance of the laser beam emitted from the laser diode 42 was properly adjusted, that is, the laser beam was properly focused onto the optical disc 1 in dependence on a thickness of the optical disc 1.

[Experiment 7]

There was used an optically data-recording apparatus which was the same as one used in the experiment 1. As the optical head 4, there was used a high-powered LD for a photo-electro-magnetic disc, emitting a light having a wavelength of 680 nm and an output power of 30 mW. As the optical disc 1, there were prepared two discs: a magneto-optic disc composed of a single substrate and having a diameter of 86 mm and a thickness of 0.8 mm, and not encased in a cartridge; and a phase-change type optical disc composed of a plurality of substrates deposited and adhered to each other, and having a diameter of 86 mm and a thickness of 0.6 mm.

Similarly to the experiment 1, the convex lens 43 was positioned in or out of an optical path between the objective lens 41 and the laser diode 42 in accordance with whether the 0.8 mm-thick disc or the 0.86 mm-thick disc was mounted in the apparatus.

In order to confirm that the apparatus having the above-mentioned structure could properly operate, the 0.8 mm-thick magneto-optic disc and the 0.6 mm-thick disc were mounted in the apparatus. First, when the 0.8 mm-thick photo-electro-magnetic disc was mounted, it was confirmed that a signal was transmitted through the second output terminal 304b. Next, when the 0.6 mm-thick disc was mounted, it was confirmed that a signal was transmitted through the third output terminal 304c. In accordance with the thus produced signals transmitted through the second or third output terminal 304b or 304c, the convex lens 43 was moved in such a manner that the convex lens 43 was not positioned in an optical path when the 0.8 mm-thick magneto-optic disc was mounted, and was positioned in an optical path when the 0.6 mm-thick disc was mounted. As a result, a focal distance of the laser beam emitted from the laser diode 42 was properly adjusted, that is, the laser beam was properly focused onto the optical disc 1 in dependence on a thickness of the optical disc 1.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

The entire disclosure of Japanese Patent Application No. 9-146484 filed on Jun. 4, 1997 including specification, claims, drawings and summary is incorporated herein by reference in its entirety.

What is claimed is:

1. An apparatus for optical recording, reproducing and erasing data into or from a recording medium, comprising:
   (a) an optical head for recording, reproducing or erasing data into or from a recording medium by emitting a light to said recording medium;
   (b) a sensor for measuring a thickness of said recording medium; and
   (c) a focal distance compensator for varying a focal distance of said light in accordance with a thickness of said recording medium sensed by said sensor.

2. The apparatus as set forth in claim 1, wherein said sensor includes:
   (a) a light source;
   (b) a first optical system for focusing a light emitted from said light source onto a recording medium;
   (c) a light detecting device; and
   (d) a second optical system for leading a light reflected from said recording medium, to said light detecting device.

3. The apparatus as set forth in claim 2, wherein said first optical system is comprised of a convex lens.

4. The apparatus as set forth in claim 2, wherein said first optical system is comprised of a combination of a convex lens and a concave lens.

5. The apparatus as set forth in claim 2, wherein said light source emits a light obliquely to said recording medium, and said light detecting device receives a regular reflection light.

6. The apparatus as set forth in claim 2, wherein said light source emits a light perpendicularly to said recording medium, and said light detecting device receives a scattered light obliquely reflected from said recording medium.

7. The apparatus as set forth in claim 6, wherein said light source is designed to emit a light having a particular wavelength, and said second optical system is comprised of a transmission type grating which passes therethrough a light incident at a predetermined angle and having said particular wavelength.

8. The apparatus as set forth in claim 2, wherein said light detecting device is comprised of a plurality of light receiving sections for detecting how a location where said light detecting device receives a light varies.

9. The apparatus as set forth in claim 8, further comprising a plurality of output terminals each of which is connected to each of said light receiving sections, so that a location where said light detecting device receives a light can be identified by detecting an output terminal through which an output signal is emitted.

10. The apparatus as set forth in claim 2, wherein said optical head is comprised of an objective lens and a laser diode, and said focal distance compensator is comprised of a variable aperture located between said objective lens and said laser diode.

11. The apparatus as set forth in claim 2, wherein said optical head includes at least an objective lens, and said focal distance compensator is comprised of a member located between said objective lens and said recording medium, said member having a variable index of refraction.

12. The apparatus as set forth in claim 11, wherein said member is composed of a transparent plate.

13. The apparatus as set forth in claim 2, wherein said optical head includes at least an objective lens, and said focal distance compensator is comprised of a member located between said objective lens and said recording medium, said member having a variable thickness.

14. The apparatus as set forth in claim 13, wherein said member is composed of a transparent plate.

15. An apparatus as recited in claim 1, wherein said sensor is arranged to discriminate at least three thicknesses of disks.

16. An apparatus as recited in claim 1, wherein said sensor has a resolution of at least 0.2 millimeter.

17. An apparatus for optical recording, reproducing and erasing data into or from a recording medium, comprising:
(a) an optical head for recording, reproducing or erasing data into or from a recording medium by emitting a light to said recording medium, said optical head including at least an objective lens and a laser diode;
(b) a sensor for measuring a thickness of said recording medium; and
(c) a focal distance compensator for varying a focal distance of said light in accordance with a thickness of the recording medium sensed by said sensor, said focal distance compensator including a convex lens located between said objective lens and said laser diode and designed to be able to located in or out of an optical path.

18. The apparatus as set forth in claim 17, further comprising a convex lens driver for moving said convex lens in such a manner that said convex lens is located in or out of an optical path.

19. The apparatus as set forth in claim 18, further comprising a spring for applying a bias force to said convex lens so that said convex lens is located out of an optical path.

20. The apparatus as set forth in claim 17, wherein said sensor includes:
(a) a light source;
(b) a first optical system for focusing a light emitted from said light source onto a recording medium;
(c) a light detecting device; and
(d) a second optical system for leading a light reflected from said recording medium, to said light detecting device.

21. The apparatus as set forth in claim 20, wherein said first optical system is comprised of a convex lens.

22. The apparatus as set forth in claim 20, wherein said first optical system is comprised of a combination of a convex lens and a concave lens.

23. The apparatus as set forth in claim 20, wherein said light source emits a light obliquely to said recording medium, and said light detecting device receives a regular reflection light.

24. The apparatus as set forth in claim 20, wherein said light source emits a light perpendicularly to said recording medium, and said light detecting device receives a scattered light obliquely reflected from said recording medium.

25. The apparatus as set forth in claim 24, wherein said light source is designed to emit a light having a particular wavelength, and said second optical system is comprised of a transmission type grating which passes therethrough a light incident at a predetermined angle and having said particular wavelength.

26. The apparatus as set forth in claim 20, wherein said light detecting device is comprised of a plurality of light receiving sections for detecting how a location where said light detecting device receives a light varies.

27. The apparatus as set forth in claim 26, further comprising a plurality of output terminals each of which is connected to each of said light receiving sections, so that a location where said light detecting device receives a light can be identified by detecting an output terminal through which an output signal is emitted.

28. An apparatus as recited in claim 17, wherein said sensor is arranged to discriminate at least three thicknesses of disks.

29. An apparatus as recited in claim 17, wherein said sensor has a resolution of at least 0.2 millimeter.

* * * * *